US009210653B2

(12) United States Patent
Narumi et al.

(10) Patent No.: US 9,210,653 B2
(45) Date of Patent: Dec. 8, 2015

(54) MOBILE COMMUNICATION METHOD, RADIO BASE STATION, RADIO NETWORK CONTROLLER, CORE NETWORK DEVICE AND GATEWAY DEVICE

(75) Inventors: Yuji Narumi, Sendai (JP); Kenichiro Aoyagi, Yokosuka (JP)

(73) Assignee: NTT DOCOMO, INC., Tokyo (JP)

( * ) Notice: Subject to any disclaimer, the term of this patent is extended or adjusted under 35 U.S.C. 154(b) by 463 days.

(21) Appl. No.: 13/257,399

(22) PCT Filed: Mar. 19, 2010

(86) PCT No.: PCT/JP2010/054857
§ 371 (c)(1),
(2), (4) Date: Oct. 24, 2011

(87) PCT Pub. No.: WO2010/107118
PCT Pub. Date: Sep. 23, 2010

(65) Prior Publication Data
US 2012/0026875 A1      Feb. 2, 2012

(30) Foreign Application Priority Data
Mar. 19, 2009   (JP) .................................. 2009-068734

(51) Int. Cl.
*H04L 12/26*      (2006.01)
*H04W 48/00*     (2009.01)
*H04W 84/04*     (2009.01)

(52) U.S. Cl.
CPC ............ *H04W 48/17* (2013.01); *H04W 84/047* (2013.01)

(58) Field of Classification Search
USPC ........................... 370/229, 232, 233, 234, 236
See application file for complete search history.

(56) References Cited

U.S. PATENT DOCUMENTS 5,640,443 A *   6/1997   Kamura ......................... 455/433
7,613,459 B2   11/2009   Woo et al.
(Continued)

FOREIGN PATENT DOCUMENTS

| CN | 1628443 A | 6/2005 |
| CN | 1642304 A | 7/2005 |

(Continued)

OTHER PUBLICATIONS

3GPP TS 23.228 V11.1.0, $3^{rd}$ Generation Partnership Project: Technical Specification Group Services and System Aspects; IP Multimedia Subsystem (IMS); Stage 2 (Release 11), pp. 1-274, (Jun. 2011).

(Continued)

*Primary Examiner* — Hassan Phillips
*Assistant Examiner* — Siren Wei
(74) *Attorney, Agent, or Firm* — Oblon, McClelland, Maier & Neustadt, L.L.P.

(57) ABSTRACT

A mobile communication method of the present invention includes step A of measuring an amount of traffic for a mobile station UE in a connection state A which is a state where the mobile station UE is connected to an access point APN #1 of an operator network via a radio base station BTS and a core network device CN, and step B of switching the connection state of the mobile station UE from the connection state A or B to a connection state C which is a state where the mobile station UE is connected to an access point APN #2 of Internet via the radio base station BTS while bypassing the connection network device CN if it is determined the measured amount of traffic satisfies a predetermined condition.

19 Claims, 8 Drawing Sheets

(56) References Cited

U.S. PATENT DOCUMENTS

| | | | |
|---|---|---|---|
| 2001/0039194 A1 | 11/2001 | Odamura | |
| 2002/0032029 A1* | 3/2002 | Angin | 455/428 |
| 2008/0019338 A1* | 1/2008 | Ishii et al. | 370/338 |
| 2009/0268739 A1* | 10/2009 | Dunbar et al. | 370/392 |
| 2010/0008341 A1* | 1/2010 | Ulupinar et al. | 370/338 |
| 2010/0027533 A1* | 2/2010 | Kant et al. | 370/355 |
| 2010/0077102 A1* | 3/2010 | Lim et al. | 709/240 |
| 2011/0002272 A1 | 1/2011 | Motohashi et al. | |

FOREIGN PATENT DOCUMENTS

| | | |
|---|---|---|
| EP | 2 472 944 A1 | 7/2012 |
| JP | 2001 320424 | 11/2001 |
| JP | 2006 74771 | 3/2006 |
| JP | 2007 329763 | 12/2007 |
| WO | WO 2008/132163 A1 | 11/2008 |
| WO | 2009 130758 | 10/2009 |
| WO | WO 2011/087223 A2 | 7/2011 |

OTHER PUBLICATIONS

International Search Report Issued Jun. 22, 2010 in PCT/JP10/054857 filed Mar. 19, 2010.

Office Action issued Sep. 27, 2013 in Chinese Application No. 201080012738.X (With English Translation).

Office Action issued Jun. 17, 2014, in Chinese Patent Application No. 201080012738.X with English translation.

European Search Report issued Apr. 25, 2014 in European Application No. 10753609-1862/2410793 PCT/JP2010054857, 8 pages.

* cited by examiner

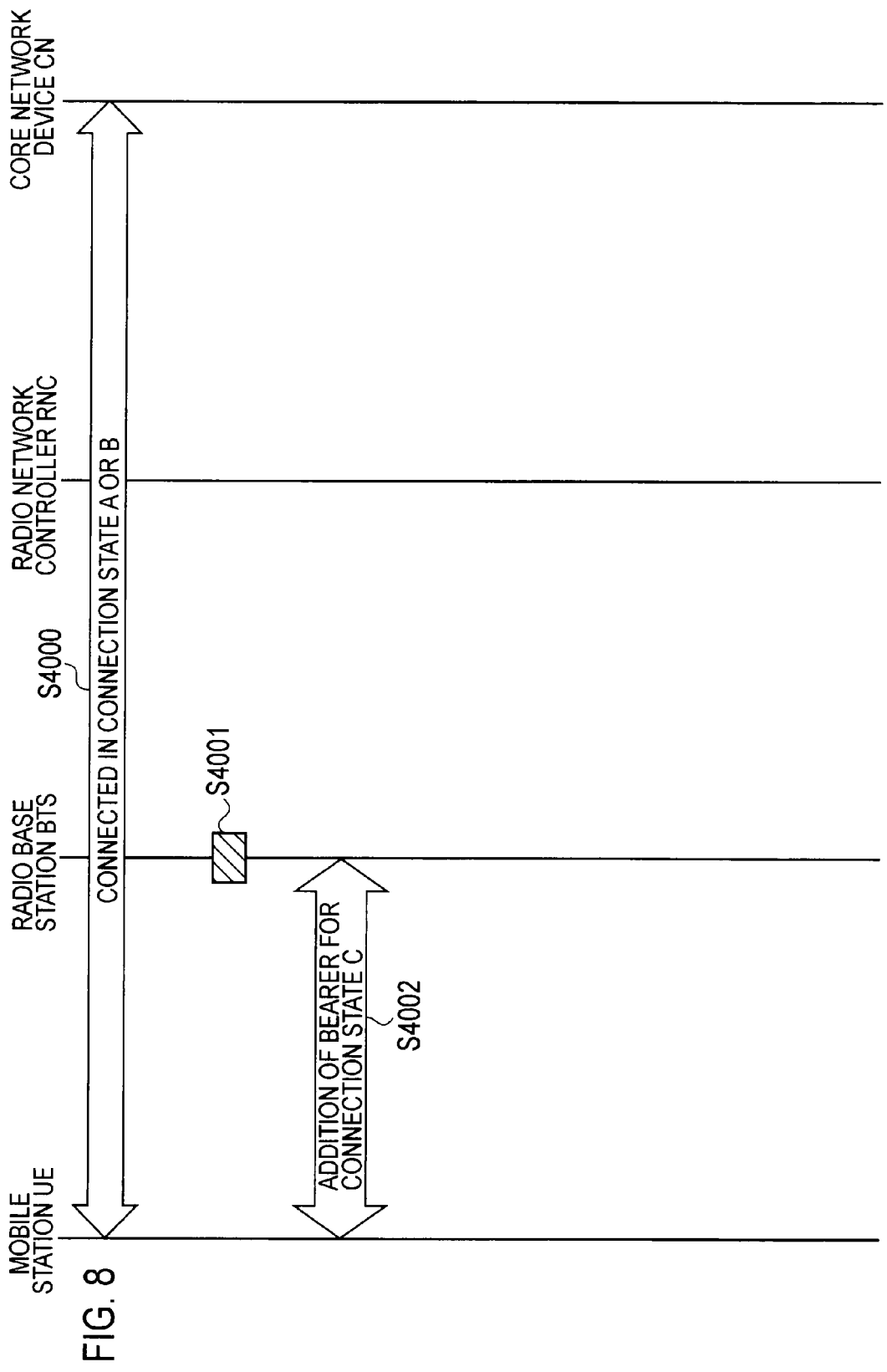

MOBILE COMMUNICATION METHOD, RADIO BASE STATION, RADIO NETWORK CONTROLLER, CORE NETWORK DEVICE AND GATEWAY DEVICE

TECHNICAL FIELD

The present invention relates to a mobile communication method, a radio base station, a radio network controller, a core network device and a gateway device.

BACKGROUND ART

In recent years, there has been a discussion about the use of small radio base stations typified by femtocell radio base stations in mobile communication systems. There has also been a discussion about performing desired communications by mobile stations in an "off loaded connection state" in such mobile communication systems. Here, the "off loaded connection state" refers to a situation where a mobile station connects to a server apparatus or the like in the Internet via the small radio base station while bypassing a core network device.

In the "off loaded connection state," even in a case where the mobile station exchanges large amount of data traffic, the processing load in the core network device in the mobile communication system can be reduced by causing the mobile station to directly connect to the Internet or the like.

PRIOR ART DOCUMENTS

Non-Patent Literature

NON-PATENT LITERATURE 1: 3GPP TS23.228 Annex. M

SUMMARY OF THE INVENTION

Problems to be Solved by the Invention

In the aforementioned conventional mobile communication systems, however, mobile stations are each configured, once starting the communications via the access point connected to a core network device, to continue using an access point until the end of communications.

In this respect, the present invention has been made in view of the aforementioned problem. An objective of the present invention is to provide a mobile communication method, a radio base station, a radio network controller, a core network device and a gateway device which allow a connection method between a mobile station and a server apparatus to be changed flexibly.

Means for Solving the Problems

The first feature of the present invention is summarized in that a mobile communication method, including: step A of measuring an amount of traffic for a mobile station in a first connection state which is a state where the mobile station is connected to an access point of a first network via a radio base station and a core network device; and step B of switching the connection state of the mobile station from the first connection state to a second connected state which is a state where the mobile station is connected to an access point of a second network via the radio base station while bypassing the connection network device if it is determined the measured amount of traffic satisfies a predetermined condition.

The second feature of the present invention is summarized in that a mobile communication method, including: step A of measuring an amount of traffic for a mobile station in a first connection state which is a state where the mobile station is connected to an access point of a first network via a radio base station and a core network device; and step B of starting a procedure to establish a bearer between the radio base station and an access point of a second network without involving the core network device when the radio base station determines that the measured amount of traffic satisfies a predetermined condition.

The third feature of the present invention is summarized in that a radio base station including: a traffic amount measuring unit configured to measure an amount of traffic for a mobile station in a first connection state which is a state where the mobile station is connected to an access point of a first network via the radio base station and a core network device; and a switch request signal transmission unit configured to transmit a switch request signal requesting to switch the connection state of the mobile station from the first connection state to a second connection state which is a state where the mobile station is connected to an access point via the radio base station while bypassing the core network device if it is determined the measured amount of traffic satisfies a predetermined condition.

The fourth feature of the present invention is summarized in that a radio base station, including: a traffic amount measuring unit configured to measure an amount of traffic for a mobile station in a first connection state which is a state where the mobile station is connected to an access point of a first network via the radio base station and a core network device; and a bearer control unit configured to start a procedure to establish a bearer between the radio base station and an access point of a second network without involving the core network device if it is determined that the measured amount of traffic satisfies a predetermined condition.

The fifth feature of the present invention is summarized in that a radio network controller located between a radio base station and a core network device, the radio network controller including: a traffic amount measuring unit configured to measure an amount of traffic for a mobile station in a first connection state which is a state where the mobile station is connected to an access point of a first network via the radio base station and the core network device; and a switch request signal transmission unit configured to transmit a switch request signal requesting to switch the connection state of the mobile station from the first connection state to a second connection state which is a state where the mobile station is connected to an access point of a second network via the radio base station while bypassing the core network device if it is determined the measured amount of traffic satisfies a predetermined condition.

The sixth feature of the present invention is summarized in that a core network device including: a traffic amount measuring unit configured to measure an amount of traffic for a mobile station in a first connection state which is a state where the mobile station is connected to an access point of a first network via a radio base station and the core network device; and a switch processing unit configured to start a procedure to switch a connection state of the mobile station from the first connection state to a second connection state which is a state where the mobile station is connected to an access point of a second network via the radio base station while bypassing the core network device if it is determined that the measured amount of traffic satisfies a predetermined condition.

The seventh feature of the present invention is summarized in that a gateway device including: a traffic amount measuring unit configured to measure an amount of traffic for a mobile station in a first connection state which is a state where the mobile station is connected to an access point of a first network via a radio base station and a core network device; and a switch processing unit configured to start a procedure to switch the connection state of the mobile station from the first connection state to a second connection state which is a state where the mobile station is connected to an access point of a second network via the radio base station while bypassing the core network device if it is determined that the measured amount of traffic satisfies a predetermined condition.

Effect of the Invention

As described above, according to the present invention, it is possible to provide a mobile communication method, a radio base station, a radio network controller, a core network device and a gateway device which allow a connection method between a mobile station and a server apparatus to be changed flexibly.

BRIEF DESCRIPTION OF THE DRAWINGS

FIG. 8 is a sequence diagram showing an operation of the mobile communication system according to Modification Example 1 of the present invention.

MODES FOR CARRYING OUT THE INVENTION

Configuration of Mobile Communication System According to First Embodiment of Present Invention The configuration of a mobile communication system according to a first embodiment of the present invention will be described with reference to FIG. 1 and FIG. 2.

Figure 1:
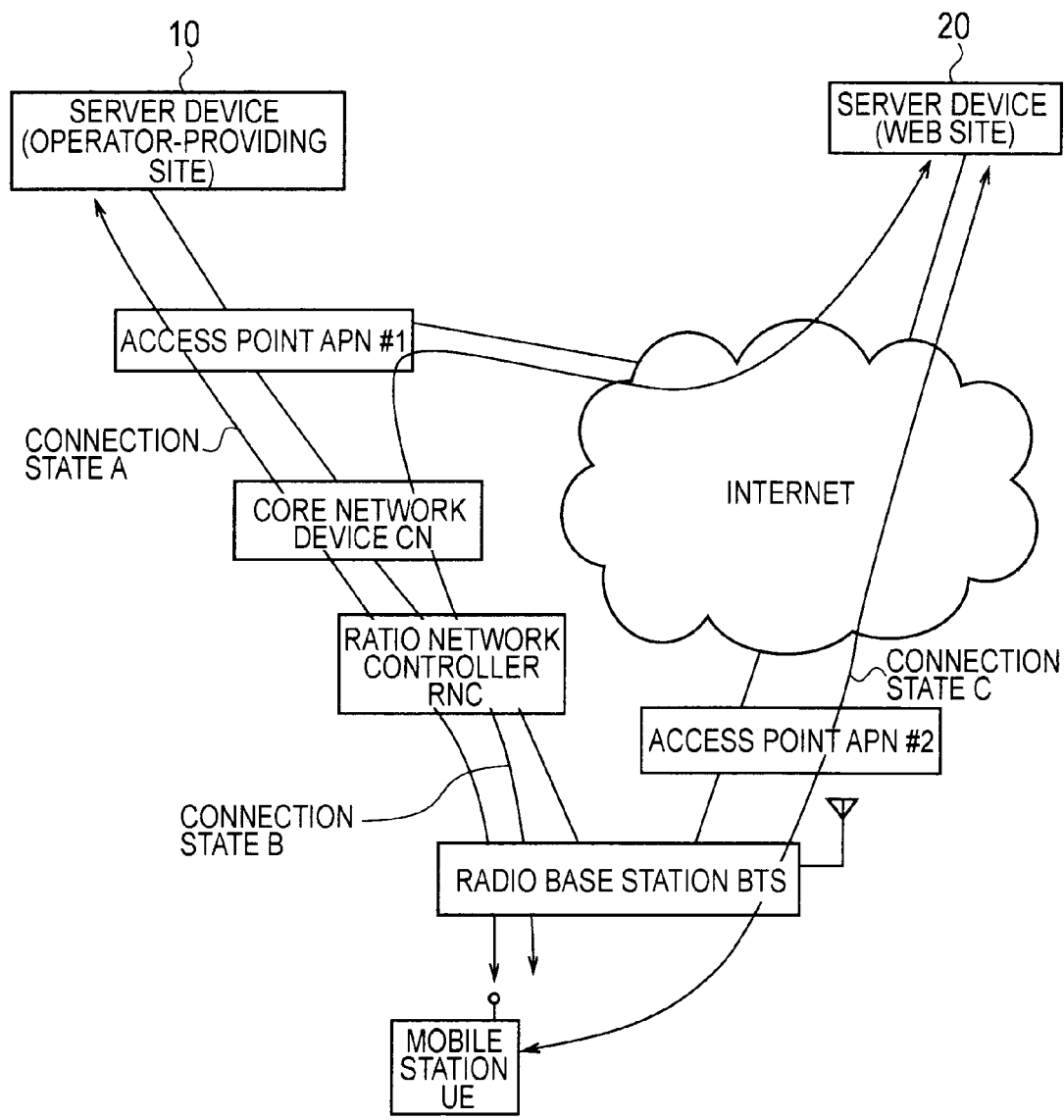
FIG. 1 is an overall configuration diagram of a mobile communication system according to a first embodiment of the present invention.

As shown in FIG. 1, the mobile communication system according to the embodiment includes a radio base station BTS, a radio network controller RNC, a core network device CN, access points APN #1, APN #2 and server apparatuses 10, 20.

The server apparatus 10 is a first server apparatus provided in an original network (operator network, first network) provided by an operator (communication carrier), and is configured to provide data for displaying operator-providing web sites. The server apparatus 20 is a second server apparatus provided in a public data communication network (second network) such as the Internet, and is configured to provide data for displaying web sites.

The server apparatus 10 and the server apparatus 20 are each configured to include a web server function, a database server function, a VoIP server function and the like, for example.

The access point APN #1 is a server apparatus configured to function as an access point to an operator network (FOMA (registered trademark) network, for example). The access point APN #2 is a server apparatus configured to function as an access point to a public data communication network.

The mobile communication system according to the embodiment may be a WCDMA mobile communication system or an LTE (Long Term Evolution) mobile communication system.

Note that, if the mobile communication system according to the embodiment is an LTE mobile communication system, the functions of the radio network controller RNC are arranged in the core network device CN and a radio base station BTS. As the core network device CN in the embodiment, a switching center or the like is used supposedly.

Here, the functions of the core network device CN and the functions of the radio network controller RNC may be provided in the radio base station BTS.

As shown in FIG. 1, in a connection state A (first connection state), which is a state where the mobile station UE is connected to the access point APN #1 via the radio base station BTS, the radio network controller RNC and the core network device CN, i.e., in an "non offloaded connection state," the mobile station UE can receive the data for displaying operator-providing web sites from the server apparatus 10 via a bearer established between the radio base station BTS and the access point APN #1.

Moreover, in a connection state B (first connection state), which is a state where the mobile station UE is connected to the access point APN #1 via the radio base station BTS, the radio network controller RNC and the core network device CN, i.e., in an "non offloaded connection state," the mobile station UE can receive the data for displaying web sites from the server apparatus 20 via a bearer established between the radio base station BTS and the access point APN #1.

Furthermore, in a connection state C (second connection state), which is a state where the mobile station UE is connected to the access point APN #2 via the radio base station BTS while bypassing the radio network controller RNC and the core network device CN, i.e., in an "offloaded connection state," the mobile station UE can receive the data for displaying web sites from the server apparatus 20 via a bearer established between the radio base station BTS and the access point APN #2.

In addition, the radio base station BTS according to the embodiment may be a small radio base station such as a femtocell radio base station (Home-eNB or the like, for example), or a macrocell radio base station.

Figure 2:
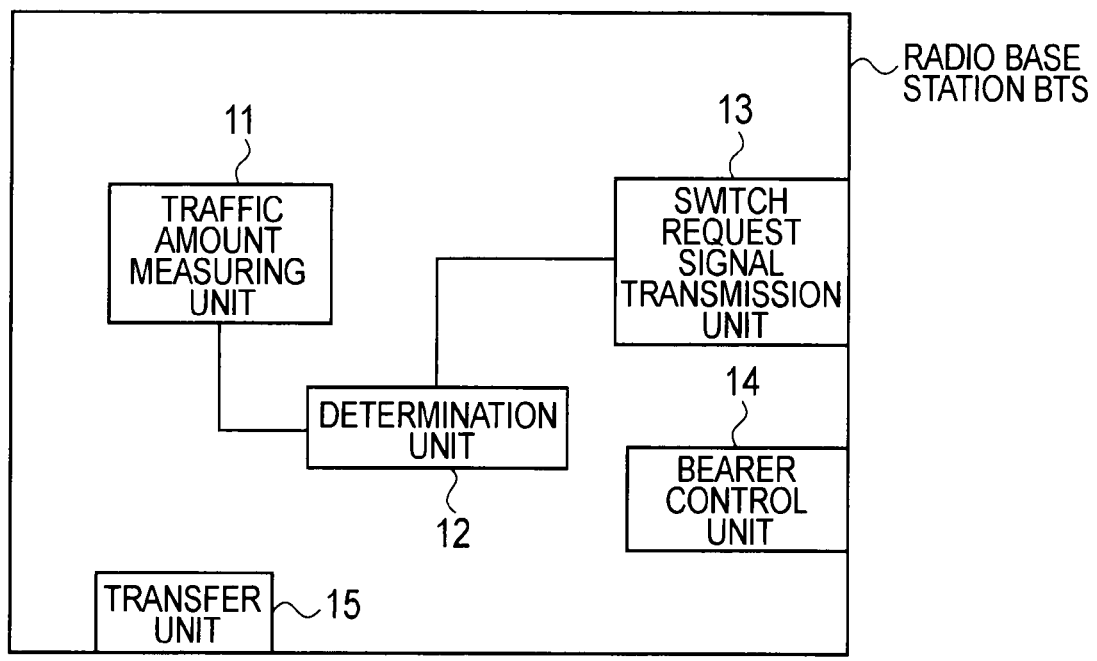
FIG. 2 is a functional block diagram of a radio base station according to the first embodiment of the present invention.

As shown in FIG. 2, the radio base station BTS includes a traffic amount measuring unit 11, a determination unit 12, a switch request signal transmission unit 13, a bearer control unit 14, and a transfer unit 15.

The traffic amount measuring unit 11 is configured to measure an amount of traffic for a mobile station UE in a connection state A or B.

The determination unit 12 is configured to determine if the amount of traffic measured by the traffic amount measuring unit 11 for the mobile station in the connection state A or B satisfies a predetermined condition.

Specifically, the determination unit 12 may be configured to determine that the amount of traffic satisfies the predetermined condition when the amount of traffic exceeds a predetermined threshold.

The switch request signal transmission unit 13 is configured to transmit a switch request signal to a core network device CN when the determination unit 12 determines that the amount of traffic for the mobile station UE in the connection state A or B satisfies a predetermined condition.

Here, the switch request signal is a signal making a request to switch the connection state of the mobile station UE from the connection state A or B to the connection state C.

Note that, the switch request signal transmission unit 13 may be configured to transmit a switch request signal to the core network device CN only in a case when the determination unit 12 determines that the amount of traffic for the mobile station UE in the connection state A or B predetermined condition is satisfied, and also the user of the mobile station UE performs a predetermined operation (such as an input operation of predetermined information on the display screen, for example).

In the aforementioned case, the radio base station BTS may include a function to allow a selection whether or not to switch the connection state of the mobile station UE from the connection state A or B to the connection state C. Such a function may allow the user to make a selection on the display screen of the mobile station UE or to make a selection as a response to LED display on the mobile station UE or to make a selection as a response to audio output from the mobile station UE, for example.

The bearer control unit 14 is configured to establish the bearers for the connection states A to C. Here, the bearer for the connection state A and the bearer for the connection state B are bearers established between the radio base station BTS and the access point APN #1. In addition, the bearer for the connection state C is a bearer established between the radio base station BTS and the access point APN #2.

The transfer unit 15 is configured to transfer signals transmitted by the mobile station UE depending on the connection state of the mobile station UE.

For example, in a case where the connection state of the mobile station UE is a connection state A or B, the transfer unit 15 is configured to transfer signals transmitted by the mobile station UE to a core network device CN or an access point APN #1 via a predetermined bearer.

On the other hand, in a case where the connection state of the mobile station UE is a connection state C, the transfer unit 15 is configured to transfer signals transmitted by the mobile station UE to an access point APN #2 via a predetermined bearer.

Note that if both of the bearers for the connection state B and connection state C are established, the transfer unit 15 may be configured to transfer the signals to either the bearer for the connection state B or the bearer for the connection state C depending on destination address information or the like contained in the signals transmitted by the mobile station UE.

Operation of Mobile Communication System According to First Embodiment of Present Invention An operation of the mobile communication system according to the first embodiment of the present invention will be described with reference to FIG. 3.

Figure 3:
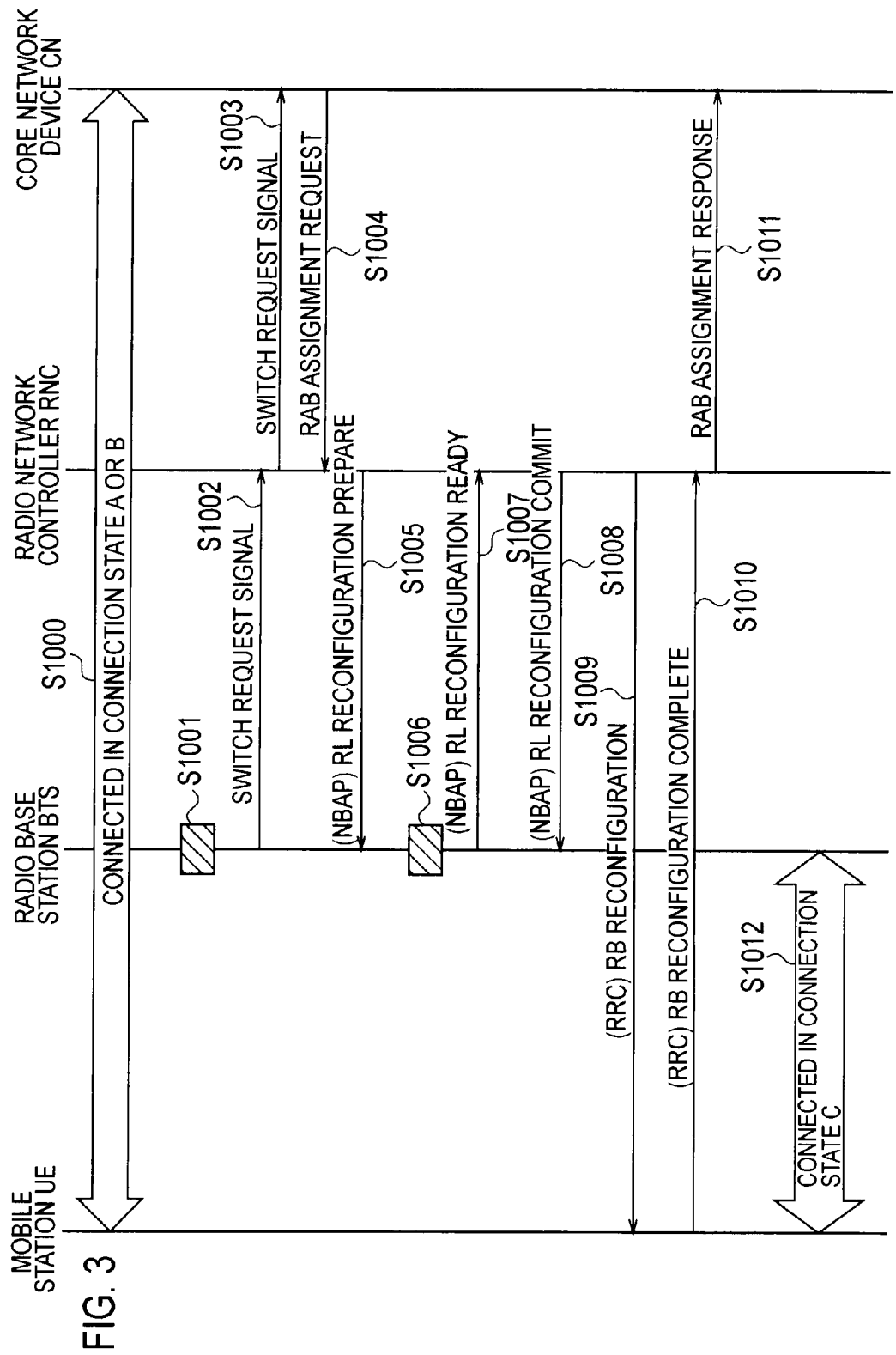
FIG. 3 is a sequence diagram showing an operation of the mobile communication system according to the first embodiment of the present invention.

As shown in FIG. 3, at step S1000, the mobile station UE in the connection state A or B displays an operator-providing site which is provided by the server device 10 or a web site A which is provided by the server device 20.

At step S1001, the radio base station BTS measures an amount of traffic for the mobile station UE in the connection state A or B to determine if the measured amount of traffic satisfies a predetermined condition.

If it is determined that the amount of traffic for the mobile station UE in the connection state A or B satisfies the predetermined condition, at step S1002, the radio base station BTS transmits a switch request signal to the radio network controller RNC.

On the other hand, if it is determined that the amount of traffic for the mobile station UE in the connection state A or B does not satisfy the predetermined condition, the radio base station BTS transfers the received signals to the radio network controller RNC.

In step S1003, the radio network controller RNC transfers the received switch request signal to the core network device CN.

In step S1004, the core network device CN starts a procedure to switch the connection state of the mobile station UE to the connection state C by transmitting an "RAB Assignment Request" message to the radio network controller RNC.

In step S1005, the radio network controller RNC transmits a "RL Reconfiguration Prepare" message to the radio base station BTS in accordance with the received "RAB Assignment Request" message.

In step S1006, the radio base station BTS performs a procedure to switch the connection state of the mobile station UE from the connection state A or B to the connection state C in accordance with the "RL Reconfiguration Prepare" message.

In step S1007, the radio base station BTS transmits a "RL Reconfiguration Ready" message to the radio network controller RNC.

In step S1008, the radio network controller RNC transmits a "RL Reconfiguration Commit" message to the radio base station BTS.

In step S1009, the radio network controller RNC transmits a "RB Reconfiguration" message to the mobile station UE.

In step S1010, the mobile station UE transmits a "RB Reconfiguration Complete" message to the radio network controller RNC.

In step S1011, the radio network controller RNC transmits a "RAB Assignment Response" message to the core network device CN.

As a result, the mobile station UE in the connection state C displays the website provided by the server apparatus 20 in step S1012.

Note that, instead of the core network device CN, the radio network controller RNC or the gateway device HNB-GW may receive the switch request signal and then starts the procedure to switch the connection state of the mobile station UE to the connection state C in accordance with the switch request signal.

Advantageous Effect of Mobile Communication System According to First Embodiment of Present Invention With the mobile communication system according to the first embodiment of the present invention, it is possible to actively use the "off loaded connection state" by switching the access point APN to which the mobile station UE is connected from one to another without disconnecting communications. Thus, the processing load on the core network device CN can be reduced.

Moreover, with the mobile communication system according to the first embodiment of the present invention, it is possible to actively use the "off loaded connection state" by switching the access point APN to which the mobile station UE is connected from one to another without disconnecting communications. The mobile station UE thus can seamlessly display a website in the Internet with low costs.

Mobile Communication System According to Second Embodiment of Present Invention

The mobile communication system according to a second embodiment of the present invention will be described with reference to FIG. 4 and FIG. 5. Hereinafter, the mobile communication system according to the embodiment will be described with a focus on a difference with the mobile communication system according to the first embodiment.

Figure 4:
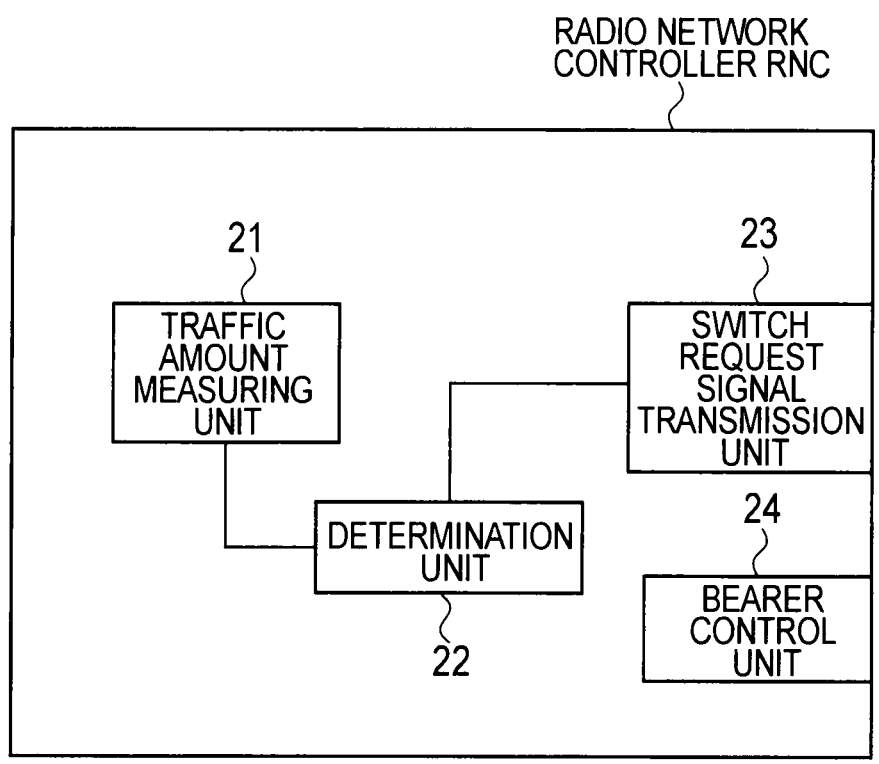
FIG. 4 is a functional block diagram of a radio network controller according to a second embodiment of the present invention.

As shown in FIG. 4, the radio network controller RNC includes a traffic amount measuring unit 21, a determination unit 22, a switch request signal transmission unit 23, and a bearer control unit 24.

These functional units are basically the same as the functional units of the radio base station BTS according to the first embodiment shown in FIG. 2.

Next, the mobile communication system according to the second embodiment of the present invention will be described with reference to FIG. 5.

Figure 5:
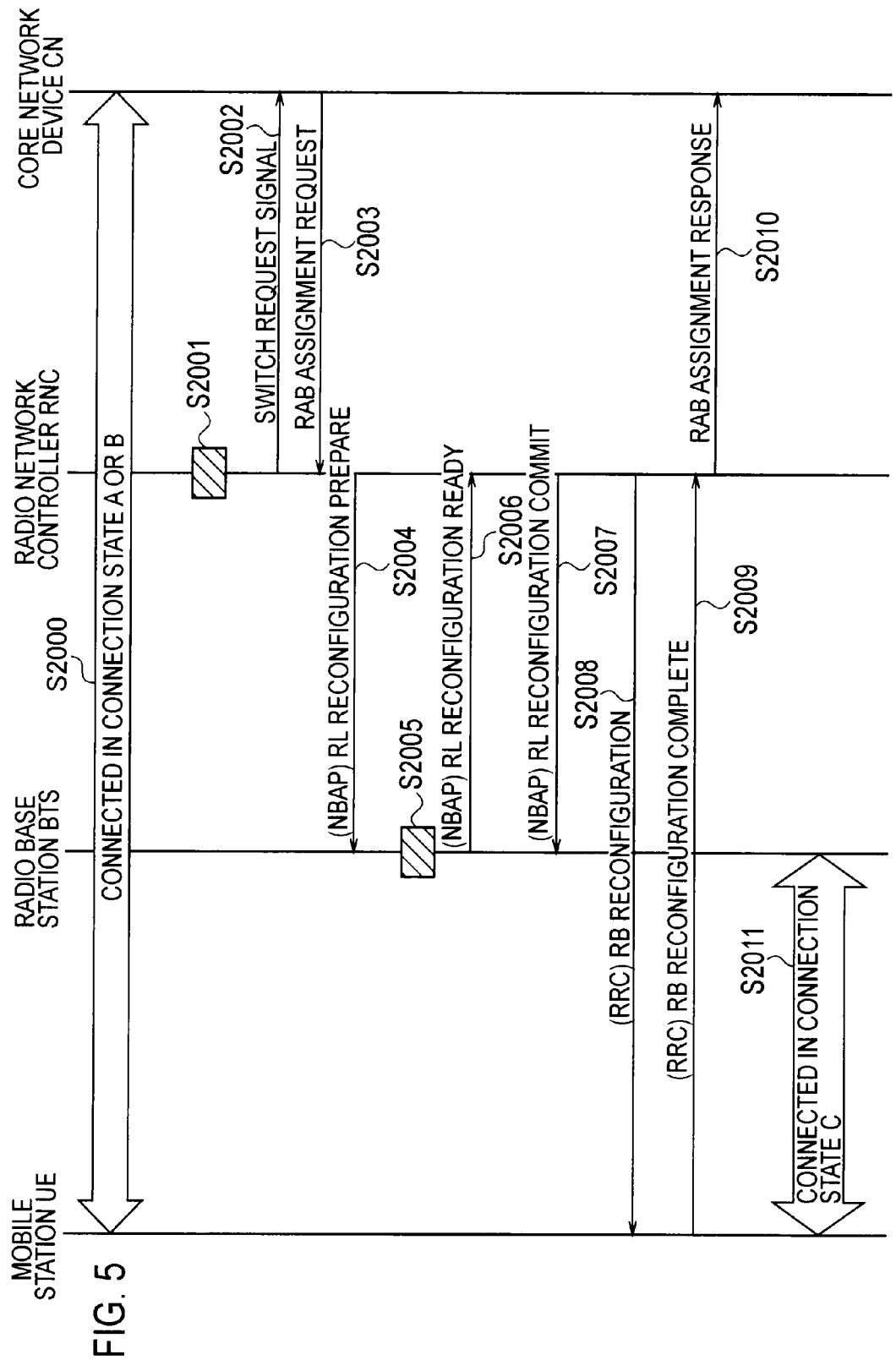
FIG. 5 is a sequence diagram showing an operation of the mobile communication system according to a second embodiment of the present invention.

As shown in FIG. 5, at step S2000, the mobile station UE in the connection state A or B displays an operator-providing site which is provided by the server 10 or a Web site A which is provided by the server device 20.

At step S2001, the radio network controller RNC measures an amount of traffic for the mobile station UE in the connection state A or B to determine if the measured amount of traffic satisfies a predetermined condition.

If it is determined that the amount of traffic for the mobile station UE in the connection state A or B satisfies the predetermined condition, at step S2002, the radio network controller RNC transmits a switch request signal to the core network device CN.

On the other hand, if it is determined that the amount of traffic for the mobile station UE in the connection state A does not satisfy the predetermined condition$_{[O]}$ A, or UE in the connection state B does not satisfy the predetermined condition$_{[O]}$ B, the radio network controller RNC transfers the received signals to the core network device CN.

The operations in steps S2003 to S2011 below are basically the same as the operations shown in steps S1004 to S1012 shown in FIG. 3.

Note that, instead of the core network device CN, the gateway devices HNB-GW may receive the switch request signal and then starts the procedure to switch the connection state of the mobile station UE to the connection state C in accordance with the switch request signal.

Mobile Communication System According to Third Embodiment of Present Invention

The mobile communication system according to a third embodiment of the present invention will be described with reference to FIG. 6 and FIG. 7. Hereinafter, the mobile communication system according to the embodiment will be described with a focus on a difference with the mobile communication system according to the first embodiment.

Figure 6:
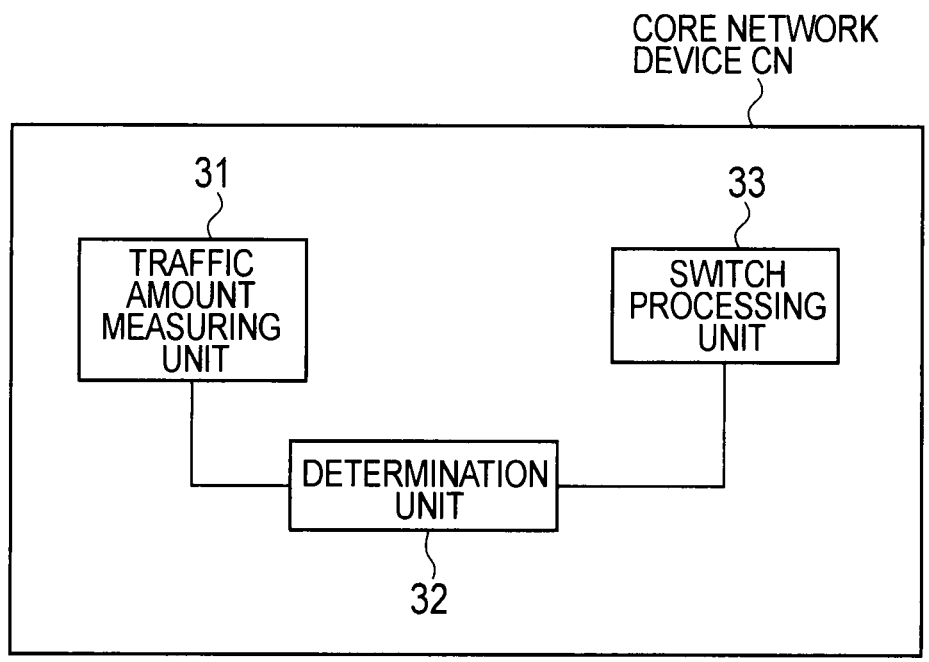
FIG. 6 is a functional block diagram of a core network device according to a third embodiment of the present invention.

As shown in FIG. 6, the core network device CN includes a traffic amount measuring unit 31, a determination unit 32, and a switch processing unit 33.

The switch processing unit 33 is configured to perform a procedure to switch the connection state of the mobile station UE. The switch processing unit 33 is configured to start the procedure to switch the connection state of the mobile station UE from the connection state A or B to the connection state C in a case when the determination unit 32 determines that the amount of traffic for the mobile station UE in the connection state A or B satisfies a predetermined condition, for example.

Note that, the gateway device HNB-GW may be configured to include the functional units of the core network device CN shown in FIG. 6.

Next, an operation of the mobile communication system according to the third embodiment of the present invention will be described with reference to FIG. 7.

Figure 7:
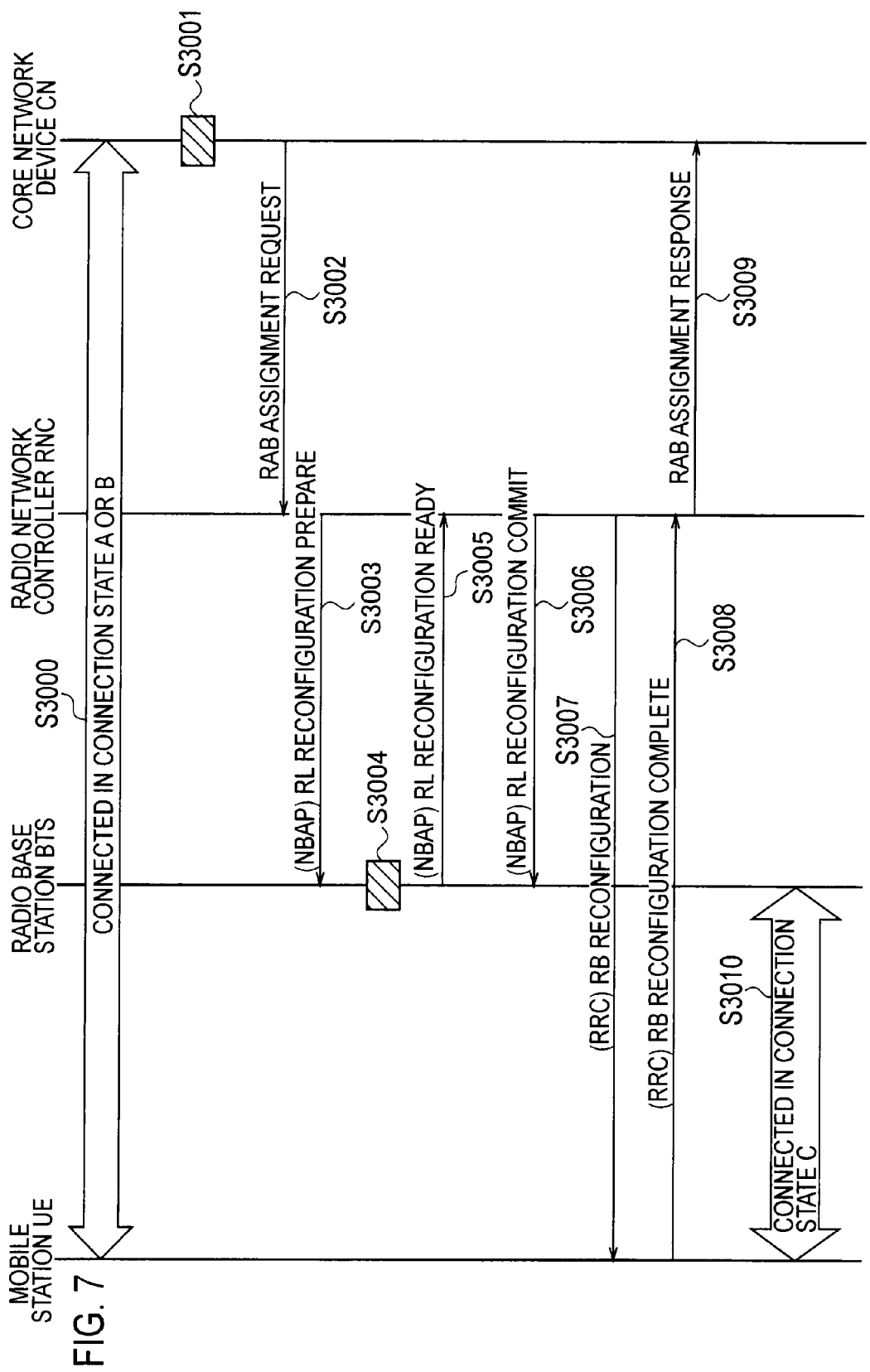
FIG. 7 is a sequence diagram showing an operation of the mobile communication system according to a third embodiment of the present invention.

As shown in FIG. 7, at step S3000, the mobile station UE in the connection state A or B displays an operator-providing site which is provided by the server device 10 or a Web site A which is provided by the server device 20.

At step S3001, the core network device CN measures an amount of traffic for the mobile station UE in the connection state A or B to determine if the measured amount of traffic satisfies a predetermined condition.

When the core network device CN determines that the amount of traffic for the mobile station UE in the connection state A or B satisfies a predetermined condition, the core network device CN starts a procedure to switch the connection state of the mobile station UE to the connection state C by transmitting an "RAB Assignment Request" message to the radio network controller RNC in step S3002.

The operations in steps S3003 to S3010 below are basically the same as the operations shown in steps S1005 to S1012 shown in FIG. 3.

Note that, instead of the core network device CN, the gateway devices HNB-GW may determine whether or not a predetermined condition is satisfied, and start the procedure to switch the connection state of the mobile station UE to the connection state C in a case where the predetermined condition is satisfied.

Modification Example 1 of Present Invention

Next, an operation of a mobile communication system according to Modification Example 1 of the present invention will be described with reference to FIG. 8. Hereinafter, the mobile communication system according to Modification Example 1 will be described with a focus on a difference with the mobile communication systems according to the first to third embodiments described above.

In the radio base station BTS according to Modification Example 1, the bearer control unit 14 may be configured to start the procedure to establish the bearer for the connection state C without releasing the bearer for the connection state A and the bearer for the connection state B in a case when the determination unit 12 determines that the amount of traffic for the mobile station UE in the connection state A or B satisfies a predetermined condition.

The transfer unit 15 may be configured to transfer the signal addressed to the server apparatus 20 to the access point APN #2 via the bearer for the connection state C first, and then, upon failure of the transfer, to transfer the connection request signal addressed to the server apparatus 20 to the access point APN #1 via the bearer for the connection state B, for example, in a case where the bearer for the connection state C is established without release of the bearer for the connection state B.

Alternatively, in this case, the transfer unit 15 may be configured to transfer the signal addressed to the server apparatus 20 to the access point APN #1 via the bearer for the connection state B first, and then, upon failure of the transfer, to transfer the connection request signal addressed to the server apparatus 20 to the access point APN #2 via the bearer for the connection state C.

Here, the transfer unit 15 may be configured to set a priority on the access point APN #1 or the access point APN #2 as the transfer destination of the signal addressed to the server apparatus 20 and then to determine that the signal addressed to the server apparatus 20 is transferred to the access points APN #1 or APN #2 on the basis of the priority.

In addition, the transfer unit 15 may be configured to store a transfer result of the signal addressed to the server apparatus 20 to the access point APN #1 or APN #2 and then to transfer the signal addressed to the server apparatus 20, preferentially to the access point APN #1 or APN #2 whichever has a successful transfer record in the past.

As shown in FIG. 8, at step S2000, the mobile station UE in the connection state A or B displays an operator-providing site provided by the server apparatus 10 or a website A provided by the server apparatus 20.

At step S4001, the radio base station BTS measures an amount of traffic for the mobile station UE in the connection state A or B to determine if the measured amount of traffic satisfies a predetermined condition.

If it is determined that the amount of traffic for the mobile station UE in the connection state A or B satisfies the predetermined condition, at step S4002, the radio base station BTS starts a procedure to establish a bearer for the connection state C without releasing the bearer for the connection state A and the bearer for the connection state B.

Aspects of the embodiments described above may be expressed in the following manner.

A first aspect of the embodiment is a mobile communication method comprising: step A of measuring an amount of traffic for a mobile station UE in a connection state A or B (first connection state) which is a state where the mobile station UE is connected to an access point APN #1 of an operator network (first network) configure to provide an operator-providing site via a radio base station BTS and a core network device CN; and step B of switching the connection state of the mobile station UE from the connection state A or B to a connection state C (second connection state) which is a state where the mobile station UE is connected to an access point APN #2 of a Internet (second network) via the radio base station BTS while bypassing the connection network device CN if it is determined the measured amount of traffic satisfies a predetermined condition.

In the first aspect of the embodiment, in the step A, the radio base station BTS may measure the amount of traffic, and in the step B, when determining that the measured amount of traffic satisfies the predetermined condition, the radio base station BTS may transmit a switch request signal, and any one of the core network device CN, a radio network controller RNC, and a gateway device HNB-GW may start a procedure to switch the connection state of the mobile station UE in accordance with the switch request signal.

In the first aspect of the embodiment, in the step A, a radio network controller RNC located between the radio base station BTS and the core network device CN may measure the amount of traffic, and in the step B, when determining that the measured amount of traffic satisfies the predetermined condition, the radio network controller RNC may transmit a switch request signal, and any one of the core network device CN and the gateway device HNB-GW may start a procedure to switch the connection state of the mobile station UE in response to the switch request signal.

In the first aspect of the embodiment, in the step A, any one of the core network device CN and the gateway device HNB-GW may measure the amount of traffic, and in the step B, when determining that the measured amount of traffic satisfies the predetermined condition, the any one of the core network device CN and the gateway device HNB-GW may start a procedure to switch the connection state of the mobile station UE.

A second characteristic of the present embodiment is a mobile communication method which comprises step A of measuring an amount of traffic for a mobile station UE in a connection state A or B and a step B of starting a procedure to establish a bearer between the radio base station BTS and an access point APN #2 of the Internet while bypassing the core network device CN if the radio base station BTS determines that the measured amount of traffic satisfies the predetermined condition.

In the first or second characteristic of the present embodiment, if the measured amount of traffic exceeds a predetermined threshold, it may be determined that the measure amount of traffic satisfies the predetermined condition.

A third characteristic of the present embodiment is a radio base station BTS which includes a traffic amount measuring unit 11 configured to measure an amount of traffic for a mobile station UE in a connection state A or B and a switch request transmission unit 13 configured to transmit a switch request signal for switching a connection state of the mobile station UE from the connection state A or B to a connection state C if it is determined that the measured amount of traffic satisfies a predetermined condition.

A fourth characteristic of the present embodiment is a radio base station BTS which includes a traffic amount measuring unit 11 configured to measure an amount of traffic for a mobile station UE in a connection state A or B and a bearer control unit 14 configured to start a procedure to establish a bearer between the radio base station BTS and an access point APN #2 of the Internet without involving a core network device CN if it is determined that the measured amount of traffic satisfies a predetermined condition.

In the fourth characteristic of the present embodiment, if the measured amount of traffic exceeds a predetermined threshold, it may be determined that the measured amount of traffic satisfies the predetermined condition.

A fifth characteristic of the present embodiment is a radio network controller RNC which is located between a radio base station BTS and a core network device CN and includes a traffic amount measuring unit 21 configured to measure an amount of traffic for a mobile station UE in a connection state A or B and a switch request transmission unit 23 configured to transmit a switch request signal for switching a connection state of the mobile station UE from the connection state A or B to a connection state C if it is determined that the measured amount of traffic satisfies a predetermined condition.

In the fifth characteristic of the present embodiment, if the measured amount of traffic exceeds a predetermined threshold, it may be determined that the measured amount of traffic satisfies the predetermined condition.

A sixth characteristic of the present embodiment is a core network device CN which includes a traffic amount measuring unit 31 configured to measure an amount of traffic for a mobile station UE in a connection state A or B and a switch processing unit 33 configured to start a procedure of switching a connection state of the mobile station UE from the connection state A or B to a connection C if it is determined that the measured amount of traffic satisfies a predetermined condition.

In the sixth characteristic of the present embodiment, if the measured amount of traffic exceeds a predetermined threshold, it may be determined that the measured amount of traffic satisfies the predetermined condition.

A seventh characteristic of the present embodiment is a gateway device HNB-GW which includes a traffic amount measuring unit 31 configured to measure an amount of traffic for a mobile station UE in a connection state A or B and a switch processing unit 33 configured to start a procedure of switching a connection state of the mobile station UE from the connection state A or B to a connection C if it is determined that the measured amount of traffic satisfies a predetermined condition.

In the characteristic of the present embodiment, if the measured amount of traffic exceeds a predetermined threshold, it may be determined that the measured amount of traffic satisfies the predetermined condition.

Note that operations of the above-described mobile station UE, radio base station BTS, radio network controller RNC, core network device CN, and gateway device HNB-GW may be implemented by hardware or may be implemented by a software module to be executed by a processor, or may be implemented in combination of the both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the radio base station BTS, the radio network controller RNC, the core network device CN, and the gateway device HNB-GW. Also, the storage medium and the processor may be provided in the mobile station UE, the radio base station BTS, the radio network controller RNC, the core network device CN, and the gateway device HNB-GW as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A method, comprising:
step A of measuring an amount of traffic for a mobile station in a first connection state which is a state where the mobile station communicates with a server by way of a radio base station, a first access point of a first network, a core network device, and a gateway device, which are each disposed between the mobile station and the server; and
step B of switching a connection state of the mobile station from the first connection state to a second connection state which is a state where the mobile station communicates with the server by way of the radio base station and a second access point of a second network, which are each disposed between the mobile station and the server, while bypassing the core network device, the gateway device, and the first access point of the first network if it is determined that the measured amount of traffic satisfies a predetermined condition.

2. The method according to claim 1, wherein
in the step A, the radio base station measures the amount of traffic, and
in the step B, when determining that the measured amount of traffic satisfies the predetermined condition, the radio base station transmits a switch request signal, and any one of the core network device, a radio network controller, and the gateway device starts a procedure to switch the connection state of the mobile station in response to the switch request signal.

3. The method according to claim 1, wherein
in the step A, a radio network controller located between the radio base station and the core network device measures the amount of traffic, and
in the step B, when determining that the measured amount of traffic satisfies the predetermined condition, the radio network controller transmits a switch request signal, and any one of the core network device and the gateway device starts a procedure to switch the connection state of the mobile station in response to the switch request signal.

4. The method according to claim 1, wherein
in the step A, any one of the core network device and the gateway device measures the amount of traffic, and
in the step B, when determining that the measured amount of traffic satisfies the predetermined condition, the any one of the core network device and the gateway device starts a procedure to switch the connection state of the mobile station.

5. A mobile communication method, comprising:
step A of measuring an amount of traffic for a mobile station in a first connection state which is a state where the mobile station communicates with a server by way of a radio base station, a first access point of a first network, a core network device, and a gateway device, which are each disposed between the mobile station and the server; and
step B of starting a procedure to establish a second connection state which is a state where the mobile station communicates with the server by way of the radio base station and a second access point of a second network, which are each disposed between the mobile station and the server, without involving the core network device, the gateway device, and the first access point of the first network when the radio base station determines that the measured amount of traffic satisfies a predetermined condition.

6. The mobile communication method according to any one of claims 1 to 5, wherein
if the measured amount of traffic exceeds a predetermined threshold, it is determined that the measured amount of traffic satisfies the predetermined condition.

7. A radio base station comprising:
circuitry configured to
measure an amount of traffic for a mobile station in a first connection state which is a state where the mobile station communicates with a server by way of the radio base station, a first access point of a first network, a core network device, and a gateway device, which are each disposed between the mobile station and the server; and
transmit a switch request signal requesting to switch a connection state of the mobile station from the first connection state to a second connection state which is a state where the mobile station communicates with the server by way of the radio base station and a second access point of a second network, which are each disposed between the mobile station and the server, while bypassing the core network device, the gateway device, and the first access point of the first network if it is determined that the measured amount of traffic satisfies a predetermined condition.

8. A radio base station, comprising:
circuitry configured to
measure an amount of traffic for a mobile station in a first connection state which is a state where the mobile station communicates with a server by way of the radio base station, a first access point of a first network, a core network device, and a gateway device, which are each disposed between the mobile station and the server; and
start a procedure to establish a second connection state which is a state where the mobile station communicates with the server by way of the radio base station and a second access point of a second network, which are each disposed between the mobile station and the server, without involving the core network device, the gateway device, and the first access point of the first network if it is determined that the measured amount of traffic satisfies a predetermined condition.

9. The radio base station according to claim 7 or 8, wherein if the measured amount of traffic exceeds a predetermined threshold, it is determined that the measured amount of traffic satisfies the predetermined condition.

10. A radio network controller located between a radio base station and a core network device, the radio network controller comprising:
circuitry configured to
measure an amount of traffic for a mobile station in a first connection state which is a state where the mobile station communicates with a server by way of the radio base station, a first access point of a first network, the core network device, and a gateway device, which are each disposed between the mobile station and the server; and
transmit a switch request signal requesting to switch a connection state of the mobile station from the first connection state to a second connection state which is a state where the mobile station communicates with the server by way of the radio base station and a second access point of a second network, which are each disposed between the mobile station and the server, while bypassing the core network device, the gateway device, and the first access point of the first network if it is determined that the measured amount of traffic satisfies a predetermined condition.

11. The radio network controller according to claim 10, wherein if the measured amount of traffic exceeds a predetermined threshold, it is determined that the measured amount of traffic satisfies the predetermined condition.

12. A core network device comprising:
circuitry configured to
measure an amount of traffic for a mobile station in a first connection state which is a state where the mobile station communicates with a server by way of a radio base station, a first access point of a first network, the core network device, and a gateway device, which are each disposed between the mobile station and the server; and
start a procedure to switch a connection state of the mobile station from the first connection state to a second connection state which is a state where the mobile station communicates with the server by way of the radio base station and a second access point of a second network, which are each disposed between the mobile station and the server, while bypassing the core network device, the gateway device, and the first access point of the first network if it is determined that the measured amount of traffic satisfies a predetermined condition.

13. The core network device according to claim 12, wherein if the measured amount of traffic exceeds a predetermined threshold, it is determined that the measured amount of traffic satisfies the predetermined condition.

14. A gateway device comprising:
circuitry configured to
measure an amount of traffic for a mobile station in a first connection state which is a state where the mobile station communicates with a server by way of the radio base station, a first access point of a first network, a core network device, and the gateway device, which are each disposed between the mobile station and the server; and
start a procedure to switch a connection state of the mobile station from the first connection state to a second connection state which is a state where the mobile station communicates with the server by way of the radio base station and a second access point of a second network, which are each disposed between the mobile station and the server, while bypassing the core network device, the gateway device, and the first access point of the first network if it is determined that the measured amount of traffic satisfies a predetermined condition.

15. The gateway device according to claim 14, wherein if the measured amount of traffic exceeds a predetermined threshold, it is determined that the measured amount of traffic satisfies the predetermined condition.

16. The method according to claim 1, wherein the radio base station transfers signals transmitted by the mobile station to the second access point in a case where the connection state of the mobile station is the second connection state.

17. The mobile communication method according to claim 5, wherein the radio base station transfers signals transmitted by the mobile station to the second access point in a case where the connection state of the mobile station is the second connection state.

18. The radio base station according to claim 7, wherein the radio base station transfers signals transmitted by the mobile station to the second access point in a case where the connection state of the mobile station is the second connection state.

19. The radio base station according to claim 8, wherein the radio base station transfers signals transmitted by the mobile station to the second access point in a case where the connection state of the mobile station is the second connection state.

* * * * *